(12) United States Patent
Chandler et al.

(10) Patent No.: US 8,571,697 B2
(45) Date of Patent: Oct. 29, 2013

(54) APPARATUS AND METHOD FOR DOUBLE END MANUFACTURING OF COMPONENTS

(75) Inventors: Jeffrey D. Chandler, Woodbury, MN (US); David Lee Johnson, Ham Lake, MN (US)

(73) Assignee: Progressive Systems, Inc., Anoka, MN (US)

( * ) Notice: Subject to any disclaimer, the term of this patent is extended or adjusted under 35 U.S.C. 154(b) by 419 days.

(21) Appl. No.: 12/868,559

(22) Filed: Aug. 25, 2010

(65) Prior Publication Data

US 2011/0093112 A1   Apr. 21, 2011

Related U.S. Application Data

(60) Provisional application No. 61/252,843, filed on Oct. 19, 2009.

(51) Int. Cl.
*G06F 19/00* (2011.01)
*B23B 39/16* (2006.01)

(52) U.S. Cl.
USPC .......................................... 700/112; 29/563

(58) Field of Classification Search
USPC ....... 700/112; 82/118; 29/563; 451/110, 261, 451/262
See application file for complete search history.

(56) References Cited

U.S. PATENT DOCUMENTS

| | | | | |
|---|---|---|---|---|
| 4,753,045 A | * | 6/1988 | Fetouh et al. | 451/261 |
| 5,465,471 A | * | 11/1995 | Munk | 29/563 |
| 6,708,385 B1 | * | 3/2004 | Lemelson | 29/563 |
| 7,065,856 B1 | * | 6/2006 | Lemelson | 29/563 |
| 7,346,973 B2 | * | 3/2008 | Ooe et al. | 29/563 |
| 2010/0288089 A1 | * | 11/2010 | Miyamoto et al. | 82/118 |

* cited by examiner

*Primary Examiner* — Dave Robertson
(74) *Attorney, Agent, or Firm* — Billion & Armitage; Richard E. Billion (57) ABSTRACT

An apparatus for machining the ends of a component includes a plurality of work stations, and a transport mechanism for moving the component along a path to the plurality of work stations. The transport mechanism is positioned to be inboard of the ends of a component. At least one of a first work station or a second work station of the plurality of workstations includes a first fixturing portion for holding a first end, and a first machine for carrying out machine operations on the first end. The first fixturing portion and the first machine are movable in a direction transverse to the path. A method of manufacturing components having two ends that are machined at both ends of a component includes conveying the component to a first work station along a path, moving a first fixture in a direction substantially transverse to the path to a position for holding one end of the component, and moving a first machine in a direction substantially transverse to the path to a position for machining one end of the component.

21 Claims, 9 Drawing Sheets

APPARATUS AND METHOD FOR DOUBLE END MANUFACTURING OF COMPONENTS

CROSS-REFERENCE TO RELATED APPLICATION

This application claims the benefit of U.S. Provisional Application No. 61/252,843 filed on Oct. 19, 2009, entitled "Apparatus and Method for Double End Manufacturing of Components."

TECHNICAL FIELD

The subject matter includes an apparatus and method for sizing the ends of components. More specifically, this relates to a double end machine having multiple work stations and a feeding mechanism, such as a center feeding mechanism.

BACKGROUND

Numerical control (NC) refers to the automation of machine tools that are operated by abstractly programmed commands encoded on a storage medium, as opposed to manually controlled via hand wheels or levers, or mechanically automated via cams alone. The first NC machines were built in the 1940s and 50s, based on existing tools that were modified with motors that moved the controls to follow points fed into the system on paper tape. These early servomechanisms were rapidly augmented with analog and digital computers, creating the modern computer numerical controlled (CNC) machine tools that have revolutionized the manufacturing process.

In modern CNC systems, end-to-end component design is highly automated using CAD/CAM programs. The programs produce a computer file that is interpreted to extract the commands needed to operate a particular machine, and then loaded into the CNC machines for production. Since any particular component might require the use of a number of different operations—drills, saws, routers, gluing, assembly, hardware insertion, end treating, etc.—modern machines often combine multiple operations into a single "cell". In other cases, a number of different machines are used with an external controller and human or robotic operators that move the component from machine to machine. In either case, the complex series of steps needed to produce any part is highly automated and produces a part that closely matches the original CAD design.

Double end machines, such as a double end tenoner, include a conveyor for moving components from work station to work station. As the components are moved past each work station, a different machining operation is performed on the end or ends of the component. In these double end machines, a transport mechanism conveys the component from work station to work station. The transport mechanism is positioned to hold the ends of the component during machining operations. One side of the double end machine has fixed position machine tools. The other side of the double end machine is adjusted for the length of the component or work piece. All stations on the adjustable side move together so that once adjusted, the machine tools associated with that side of the station are positioned to work on the same width work piece or component. These double end machines are good for manufacturing a multiplicity of work pieces or components of the same width. However, these machines are inefficient if small numbers of components of a set width or dimension are to be manufactured. When a substantially different width component needs to be manufactured, the entire machine must be cleared of any component of a different length than the next component to be manufactured. After clearing, the entire side including half the machine tools must be adjusted to the new width. In other words, once the machine is set up, components or work pieces of the same length are fed into the double ended machine as part of a production run. Changing the length or width of the component requires some down time to set up the machine again for a different length or different width component. The amount of downtime depends on how many stations are associated with the double end tenoner. When manufacturing one finished part at a time, the clearing time per part can become a higher than desired amount of time taken from production. In other words, if production runs are low in number, the downtime necessary to reset the machine makes manufacturing inefficient. In addition, production of the type where there are large production runs requires carrying large inventories of produced parts awaiting assembly into the final product. The current trend in manufacturing is just in time manufacturing where the part is made and then used or shipped. In this way, the cost of inventory goes way down since the inventory processed from raw materials into the final part is minimized.

BRIEF DESCRIPTION OF THE DRAWINGS

These and other aspects will now be described in detail with reference to the following drawings.

DETAILED DESCRIPTION

Figure 1:
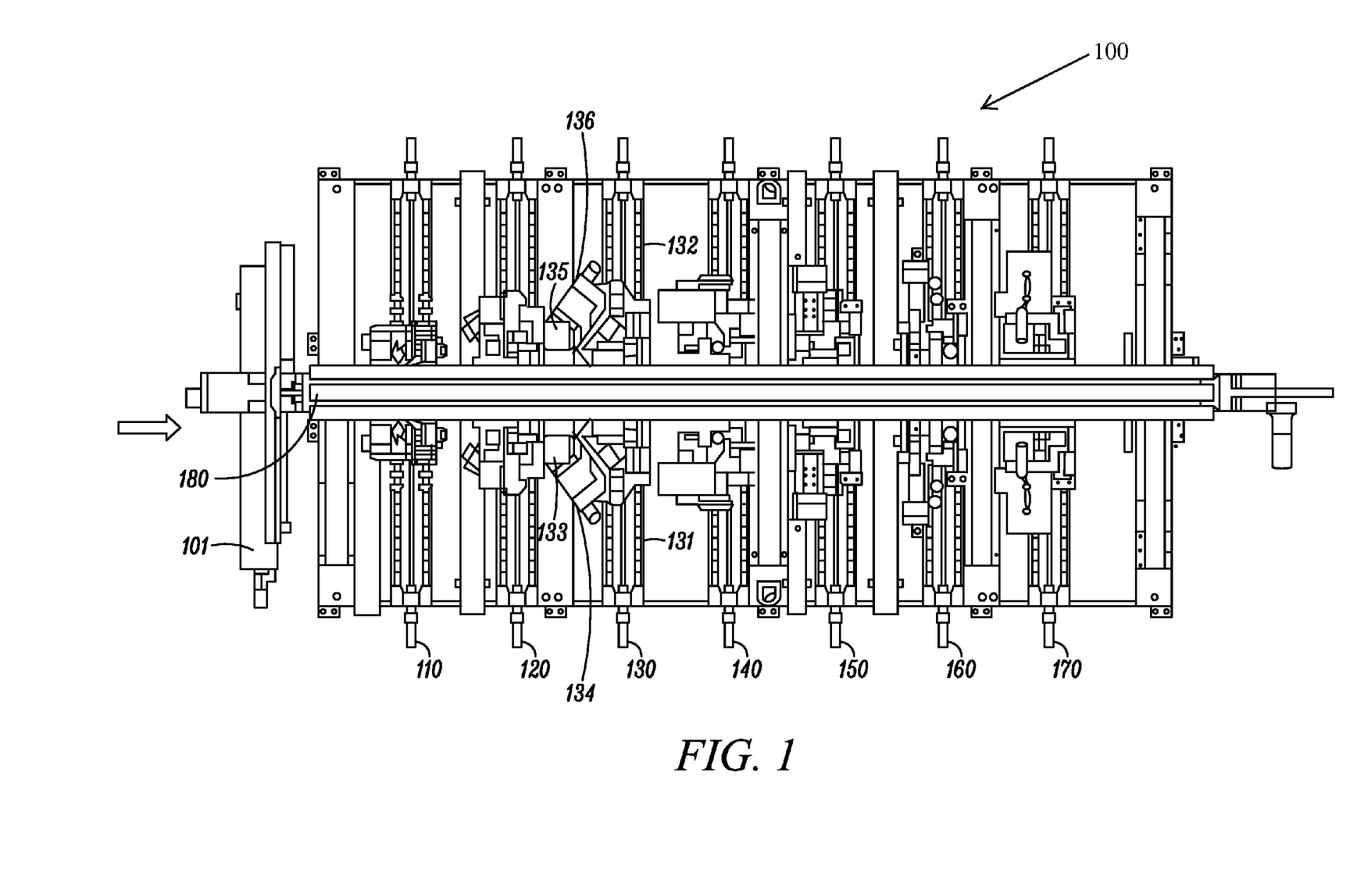
FIG. 1 is a top plan view of an apparatus for double end machining of components, according to an example embodiment.

FIG. 1 is a top view of a double end apparatus 100 with a feeding mechanism, such as a center feeding mechanism. The double end apparatus 100 machines the ends of a component, according to an example embodiment. The apparatus 100 includes a plurality of workstations 110, 120, 130, 140, 150, 160, and 170. It should be noted that components the apparatus 100 handles are shown and discussed in the figures that follow FIG. 1. The example embodiment can include to any number of workstations. The apparatus also includes a conveying apparatus 180 for moving a component from a loading area 101 to a first workstation 110 and between the plurality of workstations 110, 120, 130, 140, 150, 160, and 170. The conveying apparatus could be a chain, belt, rolls, suction carriage, grippers, or the like. The conveying apparatus 180, can be centered, as shown in FIG. 1 or can be inboard machines associated with the workstations. Each workstation 110, 120, 130, 140, 150, 160, and 170 has a right side and a left side. For example, station 130 includes a right side 131 for machining or otherwise treating one end of a component (not shown) and a left side 132 for machining or otherwise treating the other end of the component (not shown). Each workstation also has at least one fixturing portion and at least one machining or treating portion. For example station 130 has first fixturing portion 133 for holding one end of the component, and a first machine 134 for machining the one end. Station 130 also includes a second fixturing portion 135 for holding the other end of the component, and a second machine 136 for machining the other end. It should be noted that the first machine 134 and the second machine 136 may differ. All sorts of machines can be used to machine the end of a component. It should be further noted that the machines associated with other stations 110, 120, 140, 150, 160, 170 can differ as well. In other embodiments, there may be stations that do not have a fixturing portion and a machine on both the right end and left end. While machining a component, there may be stations that have only one machine. It should also be noted that there may be stations where there are no operations performed on a component. In other words, the component may stop at a station with machines and fixturing portions, but the machining operations that could be done there are skipped. It should also be pointed out that the fixtures and machines associated with the stations can move in a direction transverse to the path along which the component moves between stations.

Figure 2:
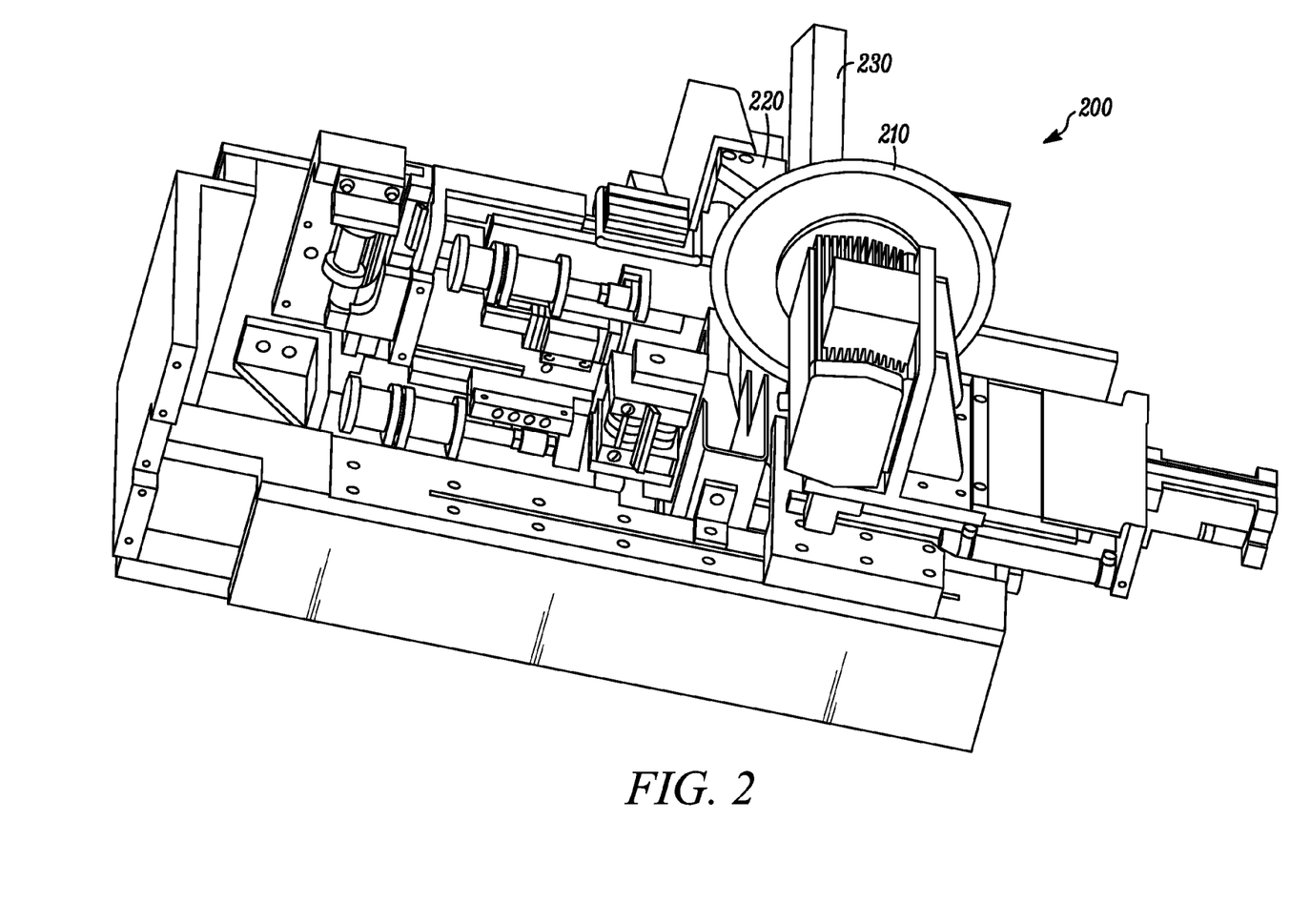
FIG. 2 is a front view of a machine associated with one of the stations of the apparatus for double end machining of components, according to an example embodiment.

FIG. 2 is an orthogonal view of a station 200, which includes a machine 210 and a fixturing component 220, according to an example embodiment. The machine 200 shown is a miter saw for end trimming components at various angles. The fixturing component 220 is holding a component 230 while the machine 210 is treating the end of the component 230. It should be noted that the machine 200 can be any type of machine and is not limited to the type of machine shown here. For example, the machine could be a saw for making a beveled cut, a drill for making openings, a router for forming an edge, a glue head for applying glue, an assembly station or hardware station for putting components together and the like. The machine 200 can be any type of machine needed to form an ornamental feature or necessary feature on the end of a component. The fixturing portion 220 holds the end of the component 230. The fixturing portion 220 typically is designed so that it can accommodate any type of piece or component that will be formed by the apparatus 100. The fixturing component 220 may have indentations or detents or other features that are not engaged with every type of component that it holds. In one embodiment, the apparatus for machining ends 100 can be used to form parts for windows, doors, cabinets and the like.

Figure 3:
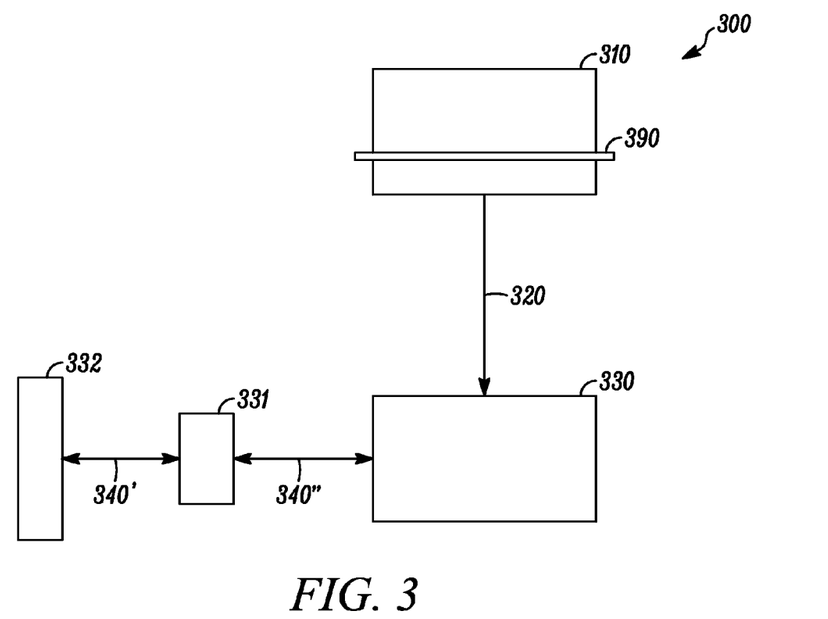
FIG. 3 is a schematic diagram of an apparatus for double end machining of a component, according to an example embodiment.

FIG. 3 is a schematic diagram of a portion of an apparatus for machining two ends 300, according to one embodiment of the invention. The apparatus 300 includes a loading station 310 and a work station 330. The workstation 330 could be any workstation on any apparatus, including one of the work stations 110, 120, 130, 140, 150, 160, 170. Raw stock of a component 390 is placed in the loading station 310 and conveyed along a path 320 to workstation 330. The path 320 is depicted by an arrow between the loading station 310 and the workstation 330. The workstation 330 includes a fixturing portion 331 and a machine 332. Both the fixturing portion 331 and the machine 332 can move along path 340. The path 340 is depicted by double ended arrows 340' and 340". The path 340 is substantially transverse to the path 320. It should be noted that the machine 332 and the fixturing portion 331 are not limited to motion along path 340. The fixturing portion 331 and the machine 332 can move other ways and in other directions as well. For example, if the machine 332 is a saw it will have to move in the direction of the cut. Similarly, the fixturing portion 331 will have sub portions that move parallel to the path 320 in order to grip or fixture the component 390. In operation, when one end of the component 390 is to be machined, the fixture is moved to hold the one end. Movement of the fixturing portion includes movement along the path 340. After fixturing, the machine is precisely positioned with respect to the component for machining the one end of the component. In some embodiments, a reference point for machining is selected away from an end of the component. In one embodiment, the reference is selected near the center of the component.

Figure 4:
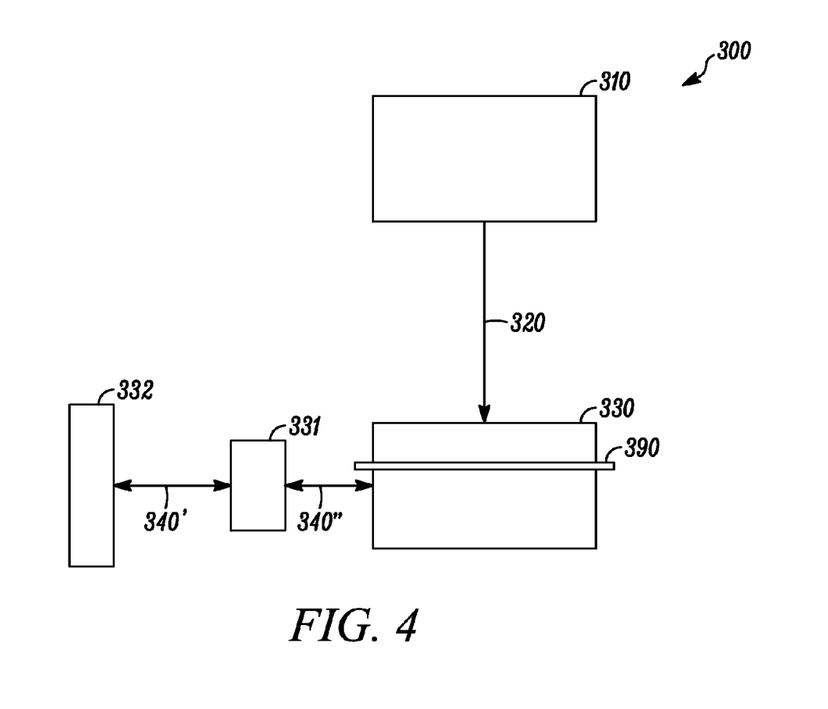
FIG. 4 is a schematic diagram of an apparatus for double end machining of components that includes a component at the work station, according to an example embodiment.

FIG. 4 is a schematic diagram of a portion of an apparatus for machining two ends 300, according to one embodiment of the invention. The apparatus 300 includes a loading station 310 and a work station 330. This is the same apparatus 300 shown in FIG. 3. The difference is that the component 390 has been moved to a position on the workstation 330. The fixturing portion 331 has been moved along path 340 transverse to path 320 so that the one end of the component can held in place. Specifically, the fixturing portion has been moved inward, when compared to the position shown in FIG. 3, to hold the end of the component 390. In addition, the machine 332 has also been moved along path 340 to a position where the machine can perform an operation on the one end of the component. Specifically, the machine 332 has been moved inward, when compared to the position shown in FIG. 3, to machine or operate on the end of the component 390. Again, it should be noted that both the fixturing portion 331 and the machine 332 are not limited to movements along path 340 but can also be moved in different directions. It should also be noted that the reference point for determining the position of the machine 332 in some embodiments is at other than one or the other end of the component 390.

Figure 5:
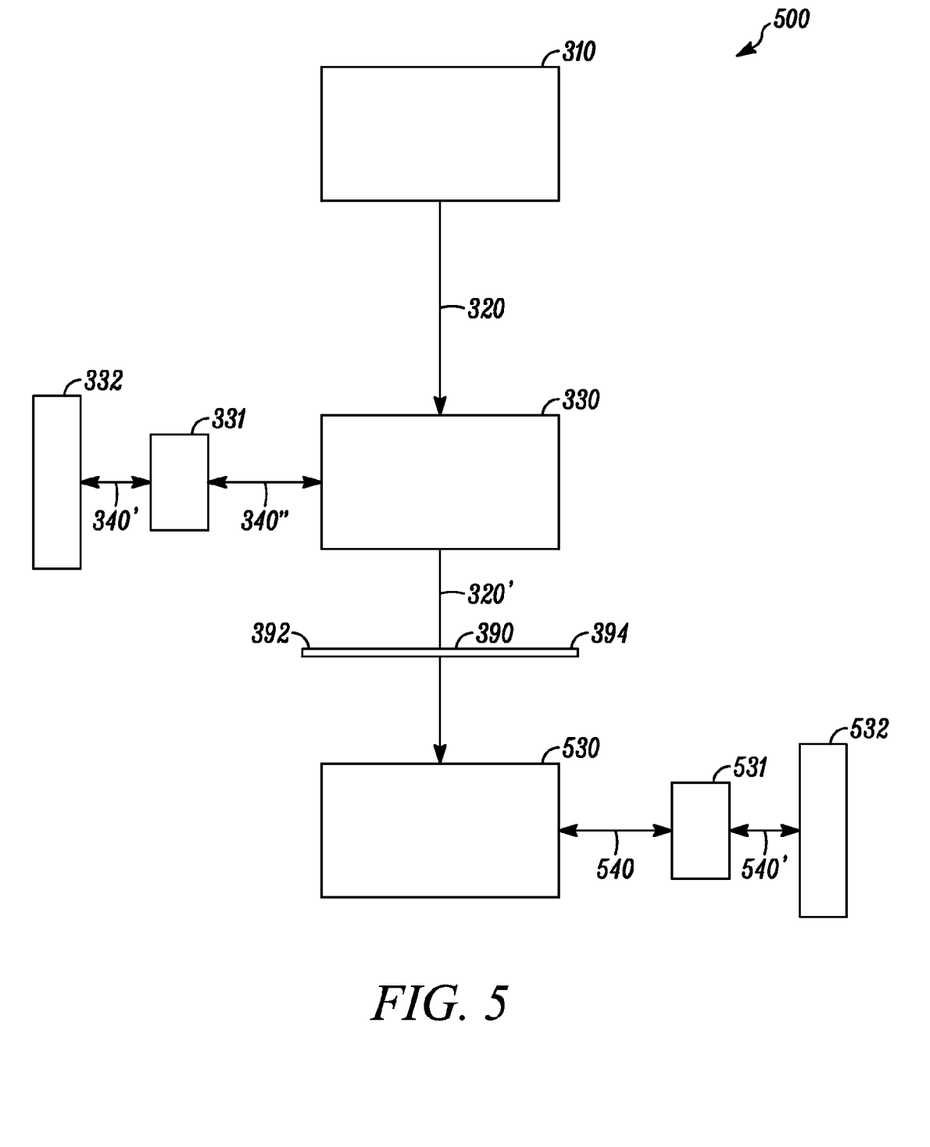
FIG. 5 is a schematic diagram of an apparatus for double end machining of components, showing two workstations, according to an example embodiment.

FIG. 5 is a schematic diagram of a portion of an apparatus for machining two ends 500, according to one embodiment of the invention. The apparatus 500 includes a loading station 310 and a work station 330. The apparatus 500 includes many of the same elements as the apparatus 300 shown in FIGS. 3 and 4. The elements which are the same will carry the same element numbers and only the different portions will carry new reference numbers. The apparatus 500 also includes workstation 530. The component 390 has one end or a first end 392 and another end or second end 394. The first end or one end 392 of the component 390 has been machined and the component is again being conveyed along path 320, as depicted by reference number 320', by a conveyance mechanism which is situated inboard of the one end 392 and the second end 394. In other words, the conveyance mechanism is positioned between the ends 392, 394 of the component 390. As shown, the conveyance mechanism is roughly centered between the ends 392, 394 of the component 390. The path 320 is depicted by an arrow between the work station 330 and the workstation 530. The workstation 530 includes a fixturing portion 531 and a machine 532. Both the fixturing portion 531 and the machine 532 can move along path 540. The path 540 is depicted by double ended arrows 540' and 540". The path 540 is substantially transverse to the path 320 (also depicted by 320'). It should be noted that the machine 532 and the fixturing portion 531 are not limited to motion along path 540. The fixturing portion 531 and the machine 532 can move other ways as well. Some portions of each of the fixturing portion 531 and the machine 532 will move in other directions as well. For example, if the machine 532 is a saw it will have to move in the direction of the cut. Similarly, the fixturing portion 531 will have sub portions that move parallel to the path 320, 320' in order to grip or fixture the component 390. In operation, when the second or other end 394 of the component 390 is to be machined, the fixture is moved to hold the end 394. Movement of the fixturing portion 531 includes movement along he path 540. After fixturing, the machine is precisely positioned with respect to the component for machining the other or second end 394 of the component. In some embodiments, a reference point for machining is selected away from an end of the component. In one embodiment, the reference is selected near the center of the component 390. It should be noted that workstation 330 and workstation 530 need not be adjacent one another in an apparatus 100. For example, there may be one or more workstations between workstations 330 and 530. The main difference between FIG. 5 and the apparatus 300 shown in FIGS. 3 and 4 is that a workstation 530 has been added to machine the other end 394 of the component 390. Again, the workstation 530 operates in a similar way in that the machine 532 and the fixturing portion 531 are able to move transverse with respect to path 320, 320' to fixture the other end or second end 394 of the component 390 and to machine the other end or second end 394 of the component 390.

Figure 6:
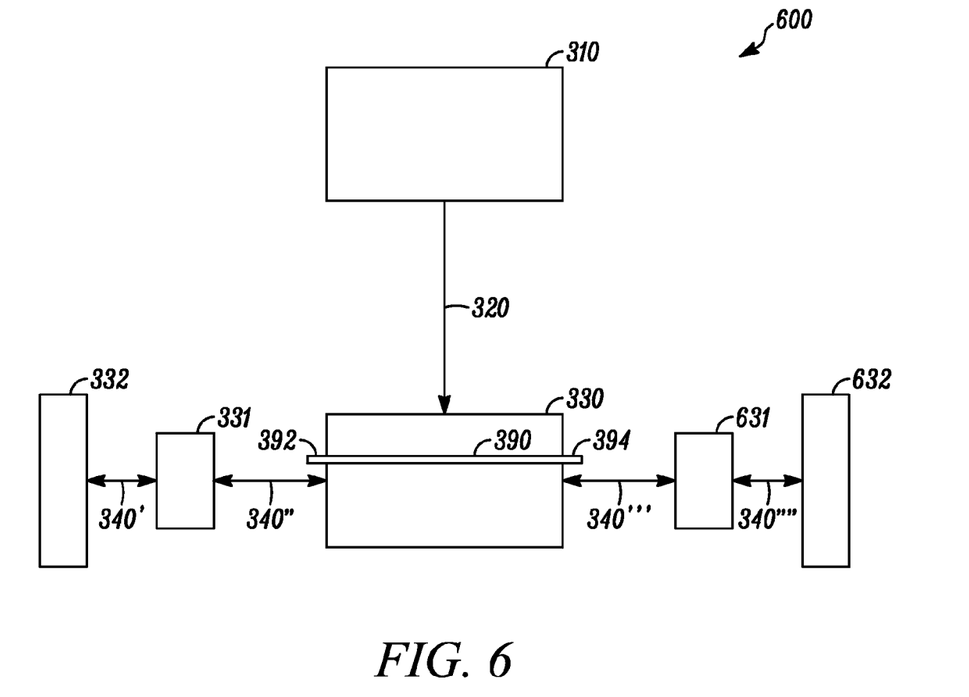
FIG. 6 is a schematic diagram of an apparatus for double end machining of components, according to an example embodiment.

FIG. 6 is a schematic diagram of a portion of an apparatus for machining two ends 600, according to one embodiment of the invention. The apparatus 600 includes a loading station 310 and a work station 330. The apparatus 600 includes many of the same elements as the apparatus 300 shown in FIGS. 3 and 4. The elements which are the same will carry the same element numbers and only the different portions will carry new reference numbers. The component 390 has one end or a first end 392 and another end or second end 394. The workstation 330 includes a fixturing portion 631 and a machine 632 for fixturing and machining the second end or other end 394 of the component 390. Both the fixturing portion 631 and the machine 632 can move along path 340. The path 340 is depicted by double ended arrows 340''' and 340''''. The path 340 is substantially transverse to the path 320. It should be noted that the machine 632 and the fixturing portion 631 are not limited to motion along path 340 (as depicted by 340''' and 340''''. The fixturing portion 631 and the machine 632 can move other ways as well. Some portions of each of the fixturing portion 631 and the machine 632 will move in other directions as well. For example, if the machine 632 is a saw it will have to move in the direction of the cut. Similarly, the fixturing portion 631 will have sub portions that move parallel to the path 320 in order to grip or fixture the component 390. In operation, when the second or other end 394 of the component 390 is to be machined, the fixture 631 is moved to hold the end 394. Movement of the fixturing portion 631 includes movement along he path 340. After fixturing, the machine 632 is precisely positioned with respect to the component for machining the other or second end 394 of the component. In some embodiments, a reference point for machining is selected away from an end of the component. In one embodiment, the reference is selected near the center of the component 390. The main difference between FIG. 6 and the apparatus 300 shown in FIGS. 3 and 4 is that a workstation 330 includes machine 632 and fixturing portion 631 for holding and machining the other end 394 of the component 390.

Figure 7:
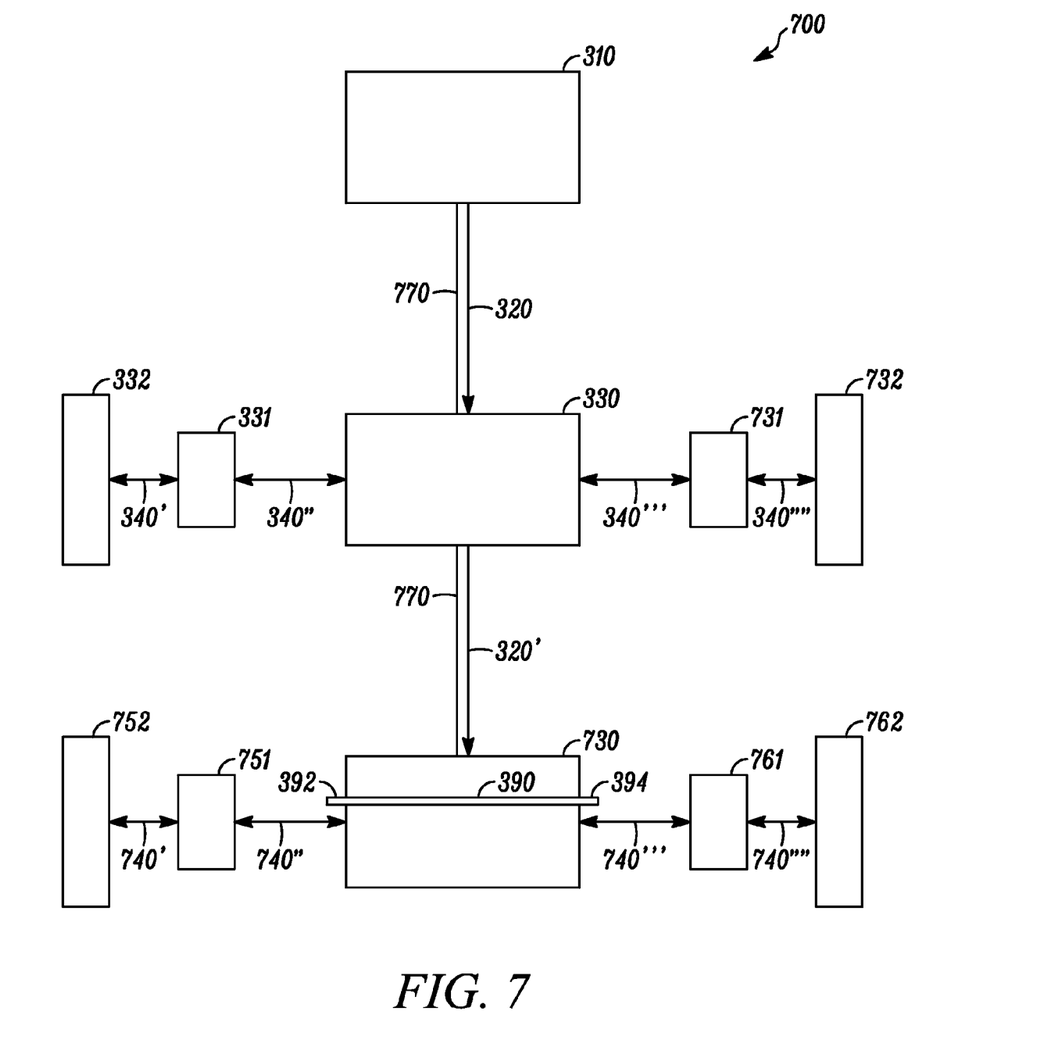
FIG. 7 is a schematic diagram of an apparatus for double end machining of components, according to an example embodiment.

FIG. 7 is a schematic diagram of a portion of an apparatus for machining two ends 700, according to one embodiment of the invention. The apparatus 700 includes a loading station 310 and a work station 330. The apparatus 700 includes a second workstation 730. The apparatus 700 includes many of the same elements as the apparatus 300 shown in FIGS. 3 and 4. The elements which are the same will carry the same element numbers and only the different portions carry new reference numbers. The component 390 has one end or a first end 392 and another end or second end 394. The workstation 330 includes a fixturing portion 331 and a machining portion 332 for fixturing and machining one or a first end 392 of the component, and a fixturing portion 731 and a machine 732 for fixturing and machining the second end or other end 394 of the component 390. Each of the elements 331, 332, 731, 732 move along a path 340. The path 340 is depicted by double ended arrows 340', 340'', 340''' and 340''''. The path 340 is substantially transverse to the path 320. It should be noted that the elements 331, 332, 731, 732 are not limited to motion along path 340 (as depicted by 340', 340'', 340''' and 340''''. The fixturing portions 331, 731 and the machines 332, 732 can move other ways as well. For example, the fixturing portions 331, 731 will have sub portions that move parallel to the path 320 in order to grip or fixture the component 390. In operation, the first or one end 392 and the other or second end of the component 394 can be fixtured and machined at substantially the same time or at different times.

The apparatus 700 also includes workstation 730 which includes and fixturing portion 751 and a machining portion 752 for fixturing a machining one or a first end 392 of the component, and a fixturing portion 761 and a machine 762 for fixturing and machining the second end or other end 394 of the component 390. Each of the elements 751, 752, 761, 762 move along a path 740. The path 740 is depicted by double ended arrows 740', 740'', 740''' and 740''''. The path 740 is substantially transverse to the path 320. It should be noted that the elements 751, 752, 761, 762 are not limited to motion along path 740 (as depicted by 740', 740'', 740''' and 740''''. The fixturing portions 751, 761 and the machines 752, 762 can move other ways as well. For example, the fixturing portions 751, 761 will have sub portions that move parallel to the path 320 in order to grip or fixture the component 390. In operation, the first or one end 392 and the other or second end of the component 394 can be fixtured and machined at substantially the same time or at different times. In some embodiments, a reference point for machining is selected away from an end of the component 390. In one embodiment, the reference is selected near the center of the component 390. It should be noted that workstations 330 and 730 may be adjacent one another in one embodiment and may be separated by several other workstations in another embodiment.

An apparatus 700 for machining the ends of a component includes a first work station 330, a second work station 730, and a transport mechanism 770 for moving the component along a path 320 to the first work station 330 and to the second work station 730. The transport mechanism 770 is positioned to be inboard of the ends 392, 394 of a component 390. At least one of the first work station 330 or the second work station 730 includes a first fixturing portion 331 for holding a first end 392, and a first machine 332 for carrying out machine operations on the first end 392. The first fixturing portion 331 and the first machine 332 are movable in a direction transverse to the path 340. At least one of the first work station 330 or the second work station 730 further includes a second fixturing portion 761 for holding a second end 394 of the component 390, and a second machine 762 for carrying out machine operations on the second end 392. The second fixturing portion 761 and the second machine 762 are movable in a direction 740 transverse to the path 320. In one embodiment, the first fixturing portion 331, the first machine 332, the second fixturing portion 731, and the second machine 732 are located at the first station. In still another embodiment, each of the first station and the second station include the first fixturing portion 331, 751, the first machine 332, 752, the second fixturing portion 731, 761, and the second machine 732, 762.

In still other embodiments, the apparatus also includes a processor 380, and memory 382 communicatively coupled to the processor 380. The processor 380 controls the position of the first fixturing portion 331 and the first machine 332. In one embodiment, the processor 380 controls the position of the first fixturing portion 331 and the first machine 332 from a reference other than at an end of the component 390. In other words, the reference can be between the ends 392, 394 of the component 390 or even off the component 390. In still other example embodiments, the processor 380 and memory 382 also can control the position of the first fixturing portion 331, the first machine 332, the second fixturing portion 731, and the second machine 732. The apparatus further includes a loading station 310 for loading rough cut components 390 of different lengths to be machined at the first station 330 and at the second station 730. In this particular example embodiment, the processor 380 also indicates which of several lengths of rough cut components 390 to load at the loading station, in addition to controlling the position of the first fixturing portion 331, the first machine 332, the second fixturing portion 731, and the second machine 732.

In some instances, the order in which multiple components 390 are loaded into the apparatus are optimized so that the least amount of movement is required of the machines and the fixturing devices when a series of components are being moved through the various workstations of the apparatus. It should be pointed out that the machines and fixturing portions of the first station and the machines and fixturing portions of the second station are capable of moving independently of one another. In other words, subsequent components do not have to be of the same length but can be of varying lengths. The machines and fixturing portions at the first workstation can move inward to machine the ends of a short component while the machines and fixturing portions at the second workstation move outward to machine a longer component. The apparatus can also be optimized based on other apparatus that are attached to the apparatus for machining two ends of a component. For example, an assembly machine might be the next apparatus. The assembly machine will take the various components output from the apparatus of machining two ends of a component, position the components, and assemble the components into a final product. The components may be of different sizes and have different end treatments, and form a plurality of different components output by the apparatus for machining two ends of a component. The entire line can be optimized to minimize manufacturing time, for example, from raw stock to assembled final product.

Figure 8:
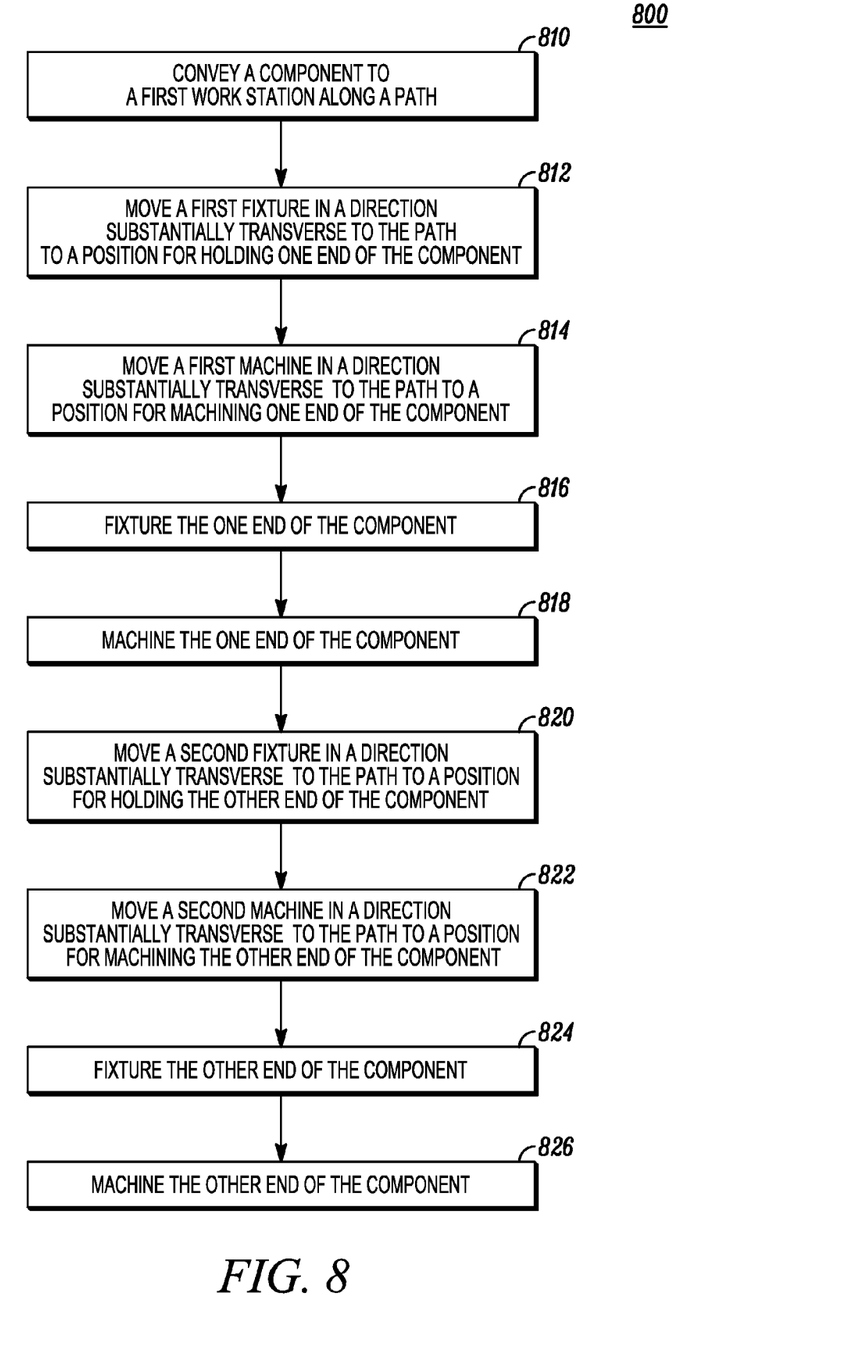
FIG. 8 is a flow chart depicting at least two methods, according to an example embodiment.

FIG. 8 is a flow charts depicting at least two methods, according to an example embodiment. Elements 810 to 818 of FIG. 8 include a first method. The first method can be continued on, in some embodiments, to form a second method. Turning now to FIG. 8, the method 800 of manufacturing components having two ends that are machined at both ends of a component includes conveying the component to a first work station along a path 810, moving a first fixture in a direction substantially transverse to the path to a position for holding one end of the component 812, and moving a first machine in a direction substantially transverse to the path to a position for machining one end of the component 814. As mentioned above, the conveyance mechanism is located inboard both ends of the component. The method 800 also includes fixturing the one end of the component 816, and machining the one end of the component 818.

In some example embodiments, the method 800 may also include the additional elements of moving a second fixture in a direction substantially transverse to the path to a position for holding the other end of the component 820, and moving a second machine in a direction substantially transverse to the path to a position for machining the other end of the component 822. The method 800 then includes fixturing the other end of the component 824, and machining the other end of the component 826. The method 800 includes positioning the first fixture, the second fixture, the first machine, and the second machine relative to a reference between the ends of the component. In some embodiments, there may be more than one reference. Conveying the component 810 includes removably attaching a conveyor at a position between the ends of the component. In some embodiments, conveying of the component 810 includes removably attaching a conveyor at a position near the center of the component. The method also includes conveying of the component to a second work station.

Figure 9:
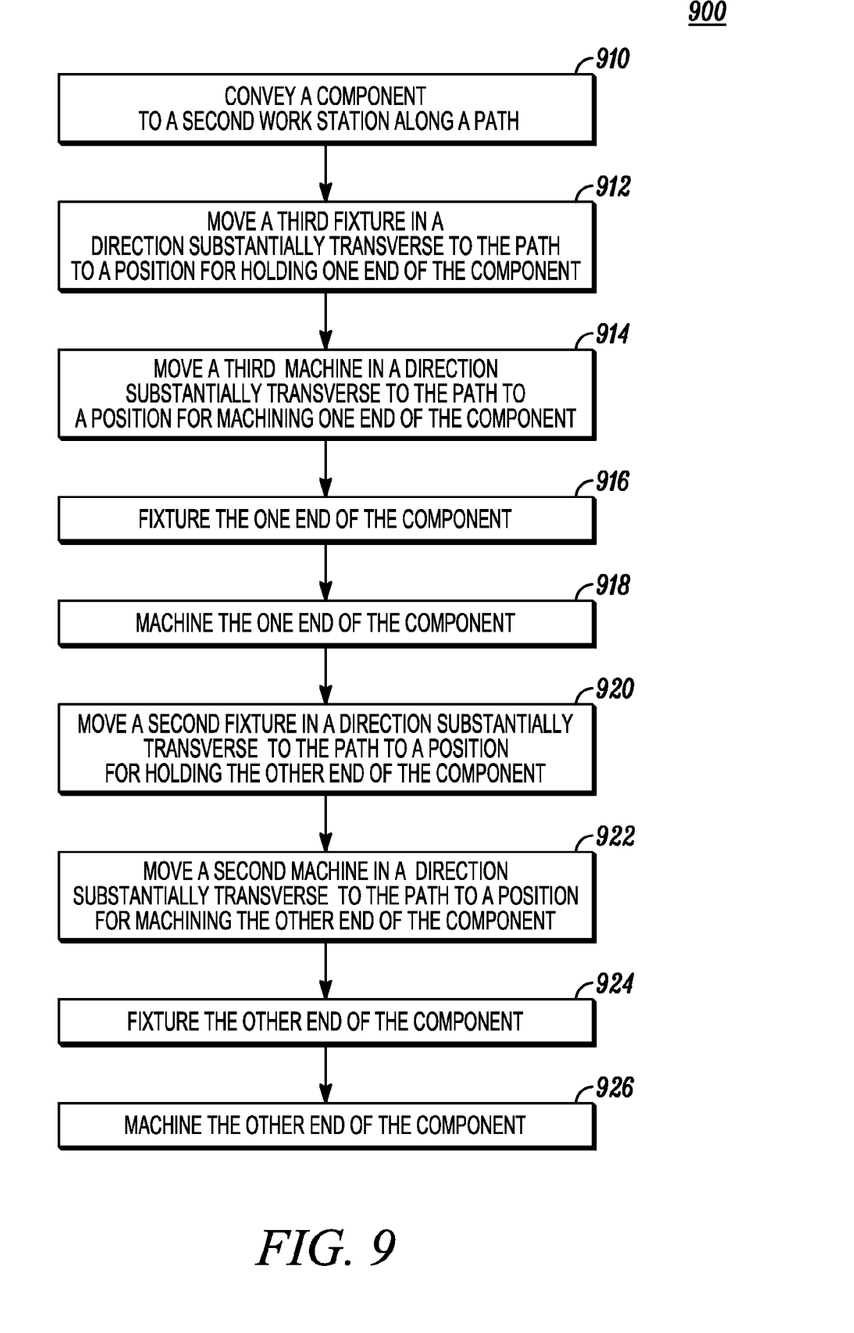
FIG. 9 is a flow chart depicting two methods, according to an example embodiment.

FIG. 9 is yet another embodiment of a method 900, according to an example embodiment. In some example embodiments, the second work station includes a third fixturing component, a third machine, a fourth fixturing component and a fourth machine. The method 900 includes conveying the component to the second workstation along a path 910. At the second workstation, the third fixturing component fixtures or holds one end of the component 912 at the second work station while the third machine is moved into position at one end of the component 914. The one end of the component is fixtured 916 and the machining operation is performed on the one end of the component 918. The fourth fixturing component fixtures is moved in a direction transverse to the path 920 and holds or fixtures the other end of the component at the second work station 924. The fourth machine is moved transverse to the path 922 while the fourth machine performs a machining operation on the other end of the component 926. In some embodiments of the invention, one or more of the above methods is controlled by a computer. The computer, in one example embodiment, controls the various positions of the components.

Various implementations of the subject matter of the method and apparatus described above may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the method and apparatus described above may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, tactile input.

The methods and apparatus described and contemplated above may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter of Appendix A), or any combination of such back-end, middleware, or front-end components, such as bar codes, RFID tags, cameras, lasers, and the like. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Figure 10:
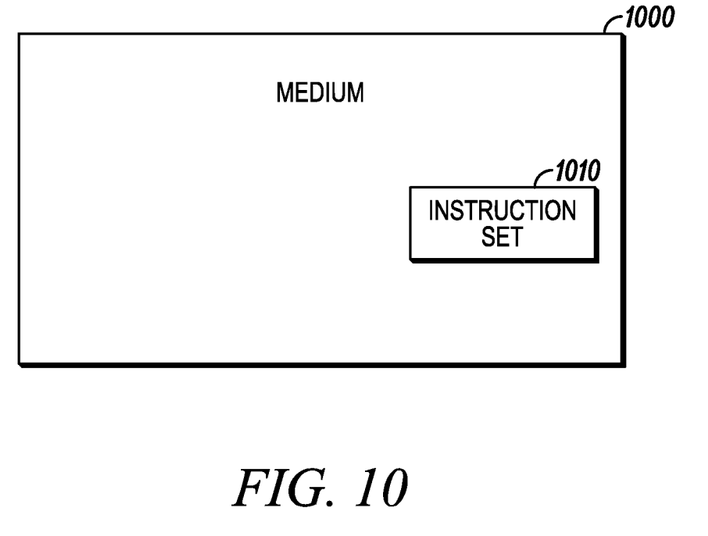
FIG. 10 is a schematic diagram of media carrying an instruction set, according to an example embodiment.

FIG. 10. is a schematic diagram of a computer readable medium 1000, according to an embodiment of the invention. The computer readable media, which is sometimes referred to as machine readable medium, 1000 includes a set of instructions 1010 which are executable by a machine such as a computer system. When executed, the machine follows the instruction set 1010. The computer readable media can be any type of media including memory, floppy disk drives, hard disk drive, or a connection to the internet or even a server which stores the machine at a remote location. The computer-readable medium 1000 provide instructions 1010 for manufacturing components having two ends that are machined at both ends. The instructions 1010, when executed by a an apparatus having a computer processor, causes the apparatus to: convey a component to a first work station along a path, move a first fixture in a direction substantially transverse to the path to a position for holding one end of the component, and move a first machine in a direction substantially transverse to the path to a position for machining one end of the component. The instructions 1010 also direct the machine to fixture the one end of the component, and machine the one end of the component. The computer-readable medium 1000 wherein the instructions 1010 further include instructions that cause the apparatus to move a second fixture in a direction substantially transverse to the path to a position for holding the other end of the component, move a second machine in a direction substantially transverse to the path to a position for machining the other end of the component. The other end of the component is then held and machined. The computer-readable instructions 1010, in some embodiments, cause the machine to move the fixture to a position for holding one end of the component, and move the machine to a position for machining one end of the component does so with respect to a reference located between the ends of the component. In some instances this reference is near the center of the component. In other instances, the reference could even be off the component. The computer readable instructions further include instructions to cause the machine to move the component to a second workstation. In some embodiments, the computer readable instructions cause a first machine and a first fixture to hold and machine an end of the component and cause a second machine and a second fixture to hold and machine the other end of the component substantially simultaneously. In other embodiments, one end of the component is machined at one workstation and the other end of the component is machined at a second workstation. In still other embodiments, the first workstation includes a first machine and a second machine for performing machine operations on the one end and the other end simultaneously. The second workstation includes a third machine and a fourth machine for performing machine operations on the one end and the other end simultaneously. It should be noted that there is no need to have the first workstation and the second workstation immediately adjacent one another.

Although a few variations have been described and illustrated in detail above, it should be understood that other modifications are possible. In addition it should be understood that the logic flow depicted in the accompanying figures and described herein do not require the particular order shown, or sequential order, to achieve desirable results. Other embodiments may be within the scope of the following claims.

What is claimed is:

1. An apparatus for machining the ends of a component comprising: a first work station; a second work station; a transport mechanism positioned to be inboard of the ends of a component, the transport mechanism moving the component along a path to the first work station and to the second work station; at least one of the first work station or the second work station including a first fixturing portion for holding a first end: and a first machine for carrying out machine operations on the first end, the first fixturing portion and the first machine movable in a direction transverse to the path.

2. The apparatus of claim 1 wherein at least one of the first work station or the second work station including a second fixturing portion for holding a second end: and a second machine for carrying out machine operations on the second end, the second fixturing portion and the second machine movable in a direction transverse to the path.

3. The apparatus of claim 2 wherein the first fixturing portion, the first machine, the second fixturing portion, and the second machine are located at the first station.

4. The apparatus of claim 2 wherein each of the first station and the second station include the first fixturing portion, the first machine, the second fixturing portion, and the second machine.

5. The apparatus of claim 1 further comprising: a processor; and
memory communicatively coupled to the processor, wherein the processor controls the position of the first fixturing portion and the first machine.

6. The apparatus of claim 5 wherein the processor controls the position of the first fixturing portion and the first machine from a reference other than at an end of the component.

7. The apparatus of claim 2 further comprising: a processor; and memory communicatively coupled to the processor, wherein the processor controls the position of the first fixturing portion, the first machine, the second fixturing portion, and the second machine.

8. The apparatus of claim 7 wherein the processor controls the position of the first fixturing portion and the first machine from a reference other than at an end of the component.

9. The apparatus of claim 2 further comprising: a loading station for loading rough cut components of different lengths to be machined at the first station and at the second station; a processor; and memory communicatively coupled to the processor, wherein the processor controls the position of the first fixturing portion, the first machine, the second fixturing portion, and the second machine, the processor also indicating which of several lengths of rough cut components to load at the loading station.

10. A method of manufacturing components having two ends that are machined at one or both ends comprising: conveying a component to a first work station along a path, the conveyance mechanism located inboard both ends of the component; moving a first fixture in a direction substantially transverse to the path to a position for holding one end of the component; moving a first machine in a direction substantially transverse to the path to a position for machining one end of the component; fixturing the one end of the component; and machining the one end of the component.

11. The method of claim 10 further comprising: moving a second fixture in a direction substantially transverse to the path to a position for holding the other end of the component; moving a second machine in a direction substantially transverse to the path to a position for machining the other end of the component; fixturing the other end of the component; and machining the other end of the component.

12. The method of claim 10 wherein the first fixture and the first machine are moved to their respective positions relative to a reference between the ends of the component.

13. The method of claim 10 wherein conveying of the component includes removably attaching a conveyor at a position between the ends of the component.

14. The method of claim 10 wherein conveying of the component includes removably attaching a conveyor at a position near the center of the component.

15. The method of claim 10 further comprising conveying of the component to a second work station.

16. The method of claim 10 wherein the method is controlled by a computer.

17. A computer-readable medium that provides instructions for manufacturing components having two ends that are machined at both ends, the instructions, when executed by a machine having a computer processor, cause the machine to: convey a component to a first work station along a path, the conveyance mechanism located inboard both ends of the component; move a fixture in a direction substantially transverse to the path to a position for holding one end of the component; move a machine in a direction substantially transverse to the path to a position for machining one end of the component; fixture the one end of the component; and machine the one end of the component.

18. The computer-readable medium of claim 17, wherein the computer readable instructions further comprise instructions that cause the machine to move a fixture in a direction substantially transverse to the path to a position for holding the other end of the component; move a machine in a direction substantially transverse to the path to a position for machining the other end of the component; fixture the other end of the component; and machine the other end of the component.

19. The computer-readable medium of claim 17, wherein the computer readable instructions that cause the machine to move the fixture to a position for holding one end of the component, and move the machine to a position for machining one end of the component does so with respect to a reference located between the ends of the component.

20. The computer-readable medium of claim 17, wherein the computer readable instructions further include instructions to cause the machine to move the component to a second workstation.

21. The computer-readable medium of claim 18, wherein the computer readable instructions cause a first machine and a first fixture to hold and machine an end of the component and cause a second machine and a second fixture to hold and machine the other end of the component substantially simultaneously.

* * * * *